United States Patent [19]
Berton et al.

[11] 3,853,980
[45] Dec. 10, 1974

[54] RUTHENIUM DECONTAMINATION OF SOLUTIONS DERIVED FROM THE PROCESSING OF IRRADIATED FUELS

[75] Inventors: Yves Berton, Puy Ste-Reparade; Pierre Chauvet, Bagnols-sur-Ceze; Stephane Clapit, Bagnols-sur-Ceze; Nicolas Fernandez, Bagnols-sur-Ceze, all of France

[73] Assignee: Commissariat A L'Energie Atomique

[22] Filed: Feb. 7, 1972

[21] Appl. No.: 224,241

[30] Foreign Application Priority Data
Feb. 8, 1971 France .................... 71.04147

[52] U.S. Cl. .............. 423/12, 423/22, 252/301.1 R
[51] Int. Cl. .................... C01g 56/00, C22b 61/04
[58] Field of Search ................. 423/22, 10, 12; 252/301.1 R

[56] References Cited
UNITED STATES PATENTS

| | | | |
|---|---|---|---|
| 2,792,412 | 5/1957 | Schmidt et al. | 423/12 |
| 2,847,278 | 8/1958 | Wilson | 423/12 |
| 2,909,406 | 10/1959 | Meservey et al. | 423/10 |
| 2,931,701 | 4/1960 | Faris | 423/12 |
| 3,004,823 | 10/1961 | Peppard et al. | 423/10 |

*Primary Examiner*—Leland A. Sebastian
*Assistant Examiner*—R. L. Tate
*Attorney, Agent, or Firm*—Craig, Antonelli & Hill

[57] ABSTRACT

The method consists in adding ferrous ions and cupric ions to the solution arising from the processing of irradiated fuels after the solution has first been put into contact if necessary with a quantity of oxidizing agent which is just sufficient to destroy in the raw effluent any substance having a potential oxidizing action on the iron which is intended to remain in the ferrous state, in rendering the solution alkaline in order to precipitate the corresponding compounds of copper and of iron, and in coagulating and filtering the slurries obtained.

16 Claims, No Drawings

RUTHENIUM DECONTAMINATION OF SOLUTIONS DERIVED FROM THE PROCESSING OF IRRADIATED FUELS

This invention relates to a method of ruthenium decontamination of solutions arising from the treatment of irradiated fuels.

Among the methods employed up to the present time for the decontamination of radioactive solutions by removal of ruthenium, there can be mentioned:
- the precipitation of ferrous hydroxide, of ferrous sulphide, or of manganese hydroxide,
- the use of lead paraperiodate,
- the use of activated iron which permit adsorption of the ruthenium and consequent separation of this latter.

This invention is directed to a method which meets practical requirements more effectively than comparable methods of the prior art, especially insofar as decontamination from ruthenium can thus be carried out more effectively at lower cost.

The method according to the invention essentially consists in adding ferrous ions and cupric ions to the solution derived from the processing of irradiated fuels after said solution has first been put into contact if necessary with a quantity of oxidizing agent which is just sufficient to destroy in the raw effluent any substance having a potential oxidizing action on the iron which is intended to remain in the ferrous state, in rendering the solution alkaline in order to precipitate the corresponding compounds of copper and of iron, and in coagulating and filtering the slurries obtained.

One advantageous feature of the method according to the invention lies in the fact that the slurries obtained can be re-used for processing another raw solution which contains ruthenium.

The method according to the invention is advantageously carried out in the following manner: Potassium permanganate is added to the solution to be treated in a quantity which is just sufficient to destroy the agents which have an oxidizing action on the ferrous ion. In practice, the addition of permanganate is stopped as soon as a persistent pink coloring is observed.

The solutions containing ferrous and cupric ions are then added.

Caustic soda is then added to the solution obtained until there are formed the corresponding compounds of copper and of iron on which is adsorbed the ruthenium contained in the starting solution.

The slurries obtained are coagulated and filtered.

The efficiency of the process is indicated by the ruthenium decontamination factor. This decontamination factor is obtained by determining the value of the ratio of ruthenium activity of the solution prior to treatment and after treatment.

By virtue of the method described in the foregoing, the ruthenium decontamination factor obtained is at least 4 times higher than that obtained by processing with an iron solution alone.

A better understanding of the invention will be gained from the following description of one mode of application of the method considered, which is given by way of example and not in any sense by way of limitation.

A first so-called "medium active" effluent is processed with a view to decontamination, the characteristics of this effluent being as follows:

acidity : 0.2 N
dry extract at pH = 7 : 105 g of salt per liter of effluent
oxidation-reduction potential (E.C.S.) : + 640 mV.

activity in mCi/m³
| | |
|---|---|
| $95_{Zr}$ + Nb | : 7.7 |
| $106_{Ru}$ | : 24.8 |
| $134_{Cs}$ | : 1.5 |
| $137_{Cs}$ | : 14.4 |
| $144_{Ce}$ | : 88.6 |

This effluent has a pH of 1.5 and there are added thereto 80 to 20 mg.$l^{-1}$ of cupric ions starting from an aqueous solution of copper sulphate, 350 to 500 mg.$l^{-1}$ ferrous ions starting from a solution of ferrous sulphate, as well as 150 mg.$l^{-1}$ of ferrocyanide ions and 37 mg.$l^{-1}$ nickel ions in the form of a colloidal aqueous suspension of nickel ferrocyanide, this latter being intended to adsorb the cesium contained in the effluent.

Caustic soda is then added to the solution obtained until the pH value is comprised between 7 and 8.5 and stirring is carried out for a period of 10 minutes.

The slurries obtained are finally coagulated if necessary by means of an anionic flocculant in a proportion in the vicinity of 20 mg.$l^{-1}$ of effluent and then filtered.

The ruthenium decontamination factor obtained under the conditions described earlier is comprised between 24 and 25.

In point of fact, by treating this effluent solely with the aqueous solution of iron sulphate mentioned above, a ruthenium decontamination factor between 4 and 5 is obtained.

By subjecting a second effluent having a pH value of 11.8 to the treatment described earlier, there is obtained a ruthenium decontamination factor which is higher than 1000, whereas the treatment with an iron solution makes it possible to obtain a decontamination factor of the order of 5.

Similarly, the method according to the invention applied to a third effluent having a pH equal to 6.6 makes it possible to obtain a ruthenium decontamination factor in the vicinity of 6 whereas the decontamination factor obtained as a result of treatment with an iron solution is of the order of 1.

Thus, the method under consideration permits a distinct improvement in the decontamination of effluents from ruthenium.

The order of addition of iron and of copper is of little importance. In order to facilitate the application of the method, it is in any case possible to introduce the copper and the iron from a single solution.

In the method according to the invention, treatment with a solution of iron and of copper is clearly compatible with the use of pre-formed precipitates of nickel ferrocyanide (cesium decontamination) and the precipitation of barium sulphate (strontium decontamination). Inasmuch as the pH value at the end of the treatment is within the range of 7 to 8.5, the method also permits decontamination from radioelements which are usually ewither precipitated or adsorbed as a result of precipitation of the ferrous and cupric hydroxides, namely: the α-emitters, zirconium, nyobium, cerium.

The slurries obtained can advantageously be re-used at the time of a first treatment by adding them to a raw effluent.

This re-use is of particular interest in the case of acid effluents.

The slurries can thus be recycled in order to reduce the quantities of reagents necessary for carrying out the method according to the invention. The installation entails the need for two systems in cascade. The reagents are introduced into the second system, the slurries of this latter being recycled to the first system.

By way of non-limitative example of this recycling of slurries, the results obtained on a fourth effluent having a pH of 1.2 are given below:

TREATMENT A

There are added to a sample of this effluent 100 mg.l$^{-1}$ of Cu$^{2+}$ and 500 mg.l$^{-1}$ of ferrous ions starting from an aqueous solution of corresponding sulphates. Caustic soda is then added until the solution has a pH of 8.5. A ruthenium decontamination factor of the order of 19 is obtained.

TREATMENT B

A second raw sample of this effluent is treated with the slurries obtained at the time of treatment a. There is then obtained a decontamination factor of the order of 8.

TREATMENT C

A third raw sample of this effluent is treated with the slurries obtained at the time of the treatment b. A decontamination factor in the vicinity of 3 is then obtained.

What we claim is:

1. A process for decontaminating ruthenium from a radioactive solution originating from the treatment of irradiated fuels and containing ruthenium comprising adding to said radioactive solution a solution of an oxidizing agent, thereafter simultaneously adding ferrous ions and cupric ions to said radioactive solution, mixing with said radioactive solution sufficient alkaline hydroxide to adjust the pH of the radioactive solution to between 7 and 8.5 so that hydroxides of copper and iron are precipitated with ruthenium adsorbed thereon, and coagulating and filtering the slurry so obtained to remove the ruthenium-containing copper and iron hydroxides therefrom, said process characterized in that the amount of oxidizing agent added to said radioactive solution is just sufficient to destroy any oxidizers of iron therein so that the ferrous ions added to said radioactive solution are not oxidized by said oxidizers.

2. A method according to claim 1, wherein the oxidizing agent added to the radioactive solution is potassium permanganate. mg.l$^-$ 3. A method according to claim 1, wherein the cupric ions are added in the form of an aqueous solution of copper sulphate in order to have in said radioactive solution between 80 and 200 mg.l$^{-1}$ of cupric ions.

4. A method according to claim 1, wherein the ferrous ions are added in the form of an aqueous solution of ferrous sulphate in order to have in said radioactive solution between 350 and 500 mg.l$^{-1}$ of ferrous ions.

5. A method according to claim 1, wherein the alkalization of the radioactive solution is carried out by the addition of caustic soda.

6. A method according to claim 1, wherein the slurries derived from the first treatment are re-used for the purpose of treating a raw effluent.

7. The process according to claim 3, wherein the ferrous ions are added in the form of an aqueous solution of ferrous sulfate in order that said radioactive solution contains between 350 and 500 mg/l ferrous ions.

8. The process according to claim 2, wherein potassium permanganate is added until said radioactive solution develops a persistent pink coloring.

9. The process according to claim 1, wherein said radioactive solution contains cesium and further wherein nickel ferrocyanide is added to said radioactive solution to adsorb said cesium.

10. The process according to claim 9 wherein about 150mg/l of ferrocyanide ions and 37 mg/l of nickel ions are added in the form of a colloidal aqueous suspension of nickel ferrocyanide.

11. The process according to claim 1 wherein coagulation is accomplished by adding an anionic flocculant to said radioactive solution.

12. The process according to claim 10, wherein the amount of anionic flocculant added is about 20 mg/l of radioactive solution.

13. The process according to claim 1 wherein the slurry so obtained is subjected to a further quantity of radioactive solution in order to remove further amounts of ruthenium therefrom.

14. The process according to claim 1 wherein said radioactive solution contains a substance tending to oxidize ferrous ions to ferric ions.

15. A process for decontaminating a radioactive solution originating from the treatment of irradiated fuels and containing ruthenium comprising adding to said radioactive solution a solution of potassium permanganate until said solution turns a persistant pink color, adding simultaneously an aqueous solution of copper sulphate and an aqueous solution of ferrous sulfate to said radioactive solution, the amount of copper sulfate added being sufficient so that said radioactive solution has between 80 and 200 mg/l of cupric ions therein and the amount of ferrous sulfate added being sufficient so that said radioactive solution has between 350 and 500 mg/l of ferrous ions therein, admixing with said radioactive solution sufficient caustic soda to adjust the pH of the solution to between 7 and 8.5 so that hydroxides of copper and iron are precipitated, and coagulating and filtrating the slurry so obtained.

16. The process according to claim 15, wherein said cupric sulfate and ferrous sulfate are added to said radioactive solution in a single aqueous solution.

* * * * *